United States Patent
Lu et al.

(10) Patent No.: US 9,917,435 B1
(45) Date of Patent: Mar. 13, 2018

(54) PIECEWISE TEMPERATURE COMPENSATION FOR POWER SWITCHING DEVICES

(71) Applicant: FORD GLOBAL TECHNOLOGIES, LLC, Dearborn, MI (US)

(72) Inventors: Xi Lu, Northville, MI (US); Chingchi Chen, Ann Arbor, MI (US); Michael W. Degner, Novi, MI (US); Zhuxian Xu, Novi, MI (US); Ke Zou, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/263,691

(22) Filed: Sep. 13, 2016

(51) Int. Cl.
*H02H 5/04* (2006.01)
*H02H 3/08* (2006.01)
*H02M 7/5387* (2007.01)

(52) U.S. Cl.
CPC .......... *H02H 3/085* (2013.01); *H02M 7/5387* (2013.01)

(58) Field of Classification Search
CPC .. H02M 1/32; H02M 7/5387; H02M 7/53871; H02M 1/34; H02M 3/33507; H02M 1/38; H02H 7/1213; H02H 7/1216; H02H 7/122; H02H 7/1222; H02H 7/1227; H02J 3/36
See application file for complete search history.

(56) References Cited

U.S. PATENT DOCUMENTS

| | | | |
|---|---|---|---|
| 2005/0194660 A1 | 9/2005 | Mochizuki et al. | |
| 2012/0146613 A1* | 6/2012 | Hamanaka | H03K 17/567 323/311 |
| 2014/0092655 A1* | 4/2014 | Igarashi | B60L 3/003 363/56.03 |
| 2015/0358013 A1 | 12/2015 | Sakai et al. | |

FOREIGN PATENT DOCUMENTS

| | | |
|---|---|---|
| CN | 104901663 A | 9/2015 |
| JP | 2007259576 | 10/2007 |
| JP | 4024531 B2 | 12/2007 |
| JP | 200989544 A | 4/2009 |
| JP | 5063124 B2 | 10/2012 |
| JP | 2012222681 | 11/2012 |

* cited by examiner

*Primary Examiner* — Nguyen Tran
(74) *Attorney, Agent, or Firm* — David B. Kelley; MacMillan, Sobanski & Todd, LLC

(57) ABSTRACT

A power switching circuit provides temperature compensation for an insulated gate power switching device. A timing circuit determines a switch timing signal comprising desired on and off switching times of the switching device. A temperature monitor quantifies a device temperature. A gate drive profile generator generates a switching device drive signal according to the switch timing signal and having a dv/dt phase and a di/dt phase. The drive signal has a profile during the di/dt phase that is adjusted in response to the device temperature, and the drive signal has a profile during the dv/dt phase that is not adjusted in response to the device temperature.

20 Claims, 8 Drawing Sheets

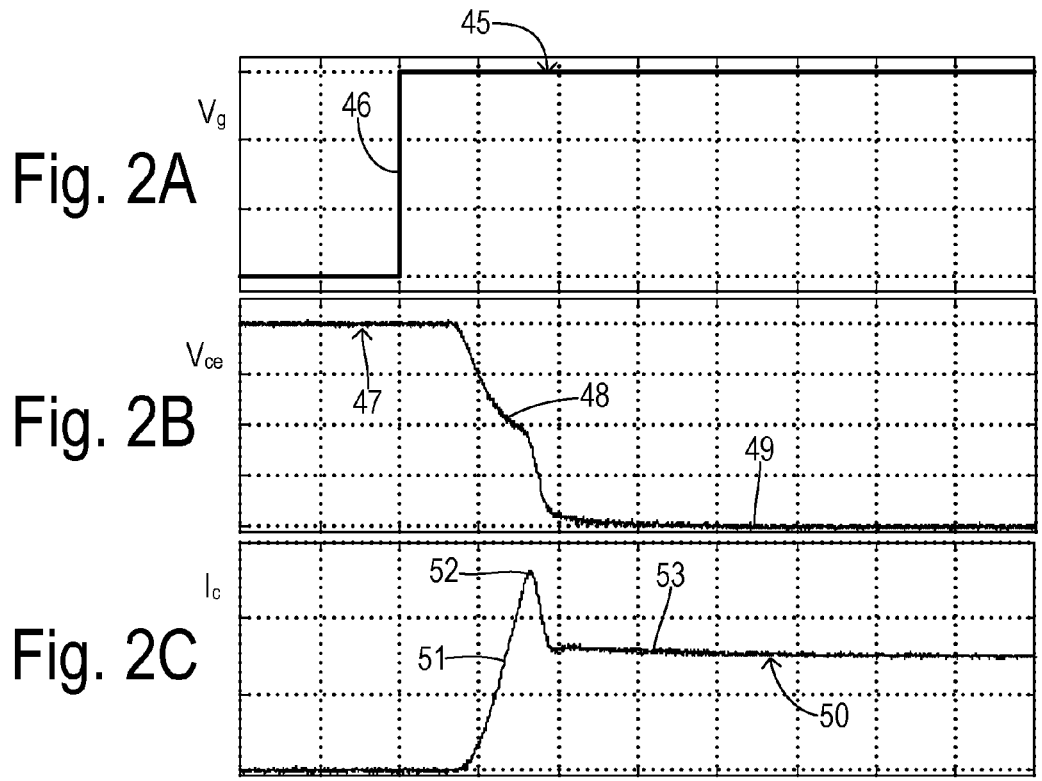
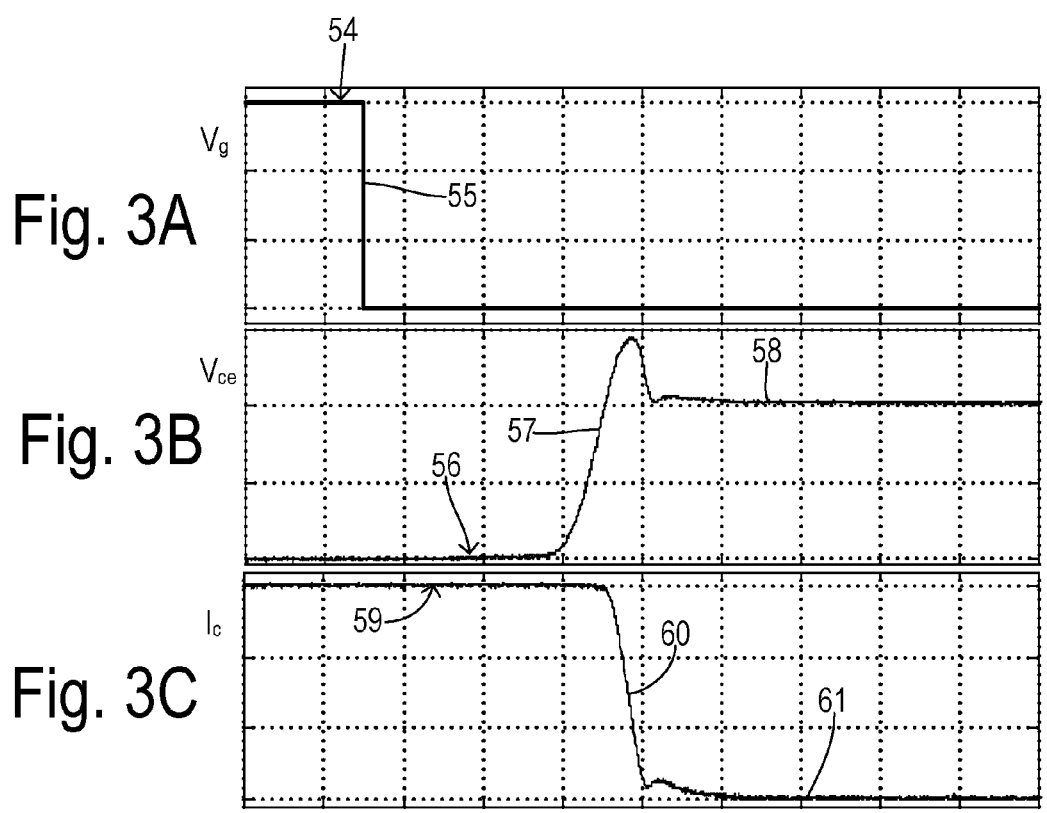

PIECEWISE TEMPERATURE COMPENSATION FOR POWER SWITCHING DEVICES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to controlling switching transients for power switching transistors, and, more specifically, to temperature-compensated gate drive signals for power converters of a type used in electrified vehicles.

Electrified vehicles, such as hybrid electric vehicles (HEVs), plug-in hybrid electric vehicles (PHEVs), and battery electric vehicles (BEVs), use inverter-driven electric machines to provide traction torque. A typical electric drive system includes a DC power source (such as a battery pack or a fuel cell) coupled by contactor switches to a variable voltage converter (VVC) to regulate a main bus voltage across a main DC link capacitor. An inverter is connected between the main buses for the DC link and a traction motor in order to convert the DC power to an AC power that is coupled to the windings of the motor to propel the vehicle.

The inverter includes transistor switching devices (such as insulated gate bipolar transistors, or IGBTs) connected in a bridge configuration including a plurality of phase legs. A typical configuration includes a three-phase motor driven by an inverter with three phase legs. An electronic controller turns the switches on and off in order to invert a DC voltage from the bus to an AC voltage applied to the motor. The inverter is controlled in response to various sensed conditions including the rotational position of the electric machine and the current flow in each of the phases.

The inverter for the motor may preferably pulse-width modulate the DC link voltage in order to deliver an approximation of a sinusoidal current output to drive the motor at a desired speed and torque. Pulse Width Modulation (PWM) control signals are applied to drive the gates of the IGBTs in order to turn them on and off as necessary. In an idealized form, the gate drive control signals are square wave signals that alternate each power switching device (e.g., IGBT) between a fully off and a fully on (saturated) state. During turn off and turn on, it takes time for the device to respond to the change in the gate drive signal. For example, after the gate drive signal transitions from a turn-off state to a turn-on state, conduction through the device output transitions from zero current flow to a maximum current flow within a few microseconds.

The optimal switching speed of a power semiconductor transistor device such as an IGBT is a tradeoff between high stresses which could destroy the device at very fast switching speeds and reduced efficiency and increase power losses at slower switching speeds. Drive circuitry for the device may be configured to energized the gate terminal of the transistor with a time varying control signal that follows a trajectory to optimized the switching speed. With changes in the temperature of the transistor, however, the switching speed also changes in response to certain parameters of the transistor including internal gate resistance, threshold voltage, and trans-conductance. Generally, as temperature increases the switching speed decreases, so that switching losses increases; as temperature decreases, the voltage and current stress increases, so that the reliability decreases. To avoid increased stress and reduced efficiency, it becomes necessary to compensate for the temperature-induced parameter changes.

A conventional design criterion for selecting the best gate control signal trajectory or slope (e.g., as determined by the gate resistance or similar control parameters) is to optimize the switching performance at the worst case—which occurs at the lowest operating temperature. Therefore, as temperature increases and the device switching speed is accordingly decreased, and there is a need adjust the control parameter in a way that tends to increase the switching speed. The switching speed has typically been increased by increasing the magnitude and/or slope of the current being supplied to the gate by the gate drive signal in proportion to the temperature increase. For example, the gate current can be varied directly by using a controllable current source for the gate driver, or the gate current can be manipulated indirectly by increasing the gate voltage or decreasing the gate resistance. The parameters have been adjusted 1) using a closed-loop control system based on a measured temperature, and 2) automatically by incorporating a negative-temperature coefficient (NTC) resistance connected to the gate, for example. However, it has been found that not all aspects of the switching transient need to be adjusted by temperature variations with controlled current source. Thus, even better optimization is possible beyond the blanket modifications to the gate drive signals used in the prior art.

SUMMARY OF THE INVENTION

The present invention recognizes that the switching transient includes two separate portions: a dv/dt portion and a di/dt portion. The dv/dt portion barely changes with temperature if the gate is driven by constant current source because the junction capacitance is not a strong function of the temperature. The di/dt portion changes more strongly with temperature due to variations in the threshold voltage and trans-conductance value. The prior art does not treat the di/dt and dv/dt portions separately. Consequently, when adjusting the gate supply voltage, gate current or gate resistance at different temperatures, one of the changing di/dt or dv/dt could be adjust to be optimum, while the other one of the di/dt or dv/dt could not simultaneously be optimum. The invention separately controls the di/dt and dv/dt portions so that each can be optimized.

In one aspect of the invention, a power switching circuit is provided with an insulated gate power switching device. A timing circuit determines a switch timing signal comprising desired on and off switching times of the switching device. A temperature monitor quantifies a device temperature. A gate drive profile generator generates a switching device drive signal according to the switch timing signal and having a dv/dt phase and a di/dt phase. The drive signal has a profile during the di/dt phase that is adjusted in response to the device temperature, and the drive signal has a profile during the dv/dt phase that is not adjusted in response to the device temperature. The profile generator is preferably comprised of a controlled current source.

BRIEF DESCRIPTION OF THE DRAWINGS

FIGS. 2A, 2B, and 2C are waveform plots relating to the turning on of a transistor device.

FIGS. 3A, 3B, and 3C are waveform plots relating to the turning off of a transistor device.

FIG. 12 is a plot showing a representative example with a constant slope for a desired collector current transient during a di/dt phase with the device turning on.

FIG. 20 is a waveform diagram showing a modified gate drive profile during dv/dt and di/dt phases with the device turning on.

DETAILED DESCRIPTION OF PREFERRED EMBODIMENTS

Figure 1:
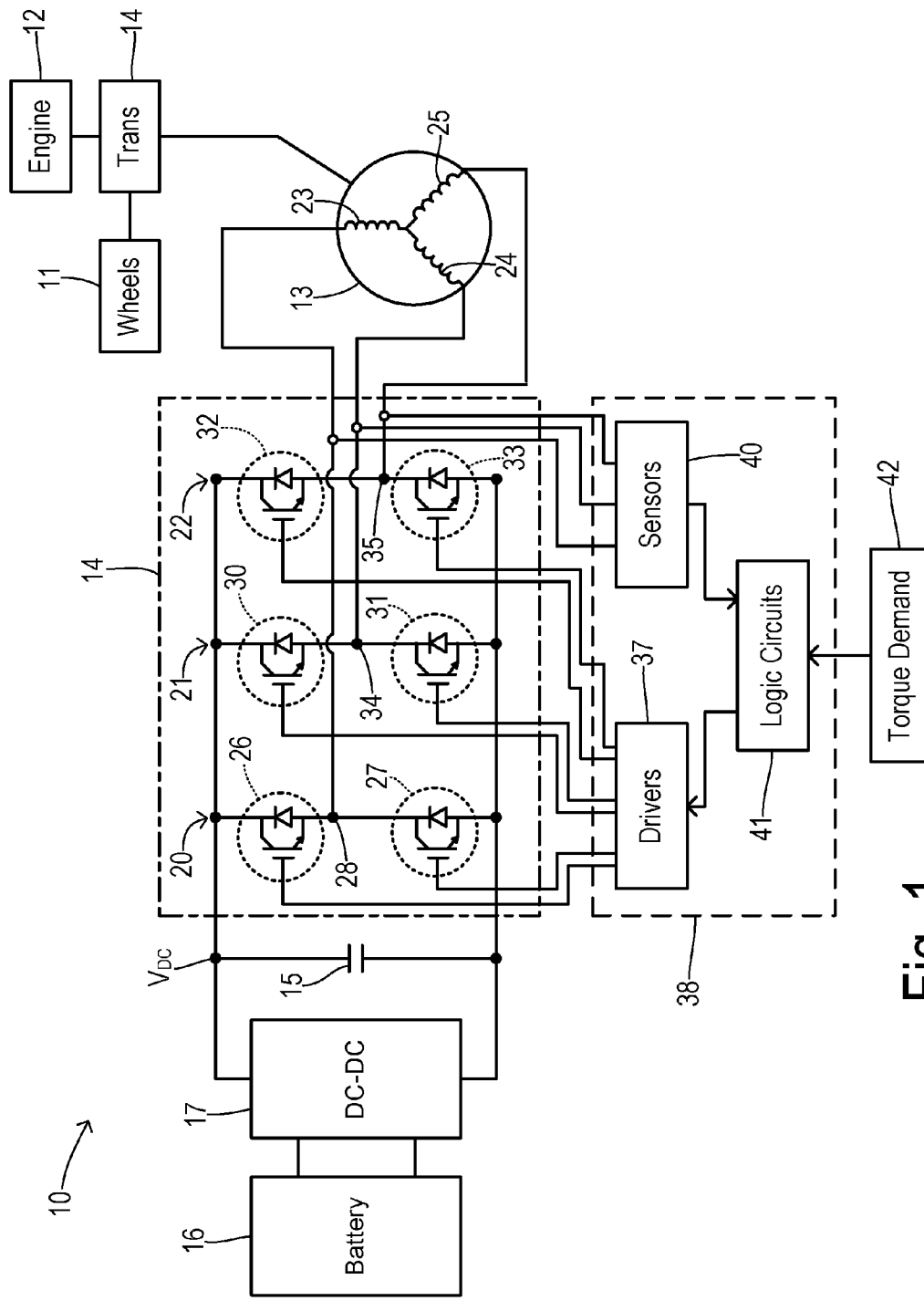
FIG. 1 is a schematic, block diagram showing a powertrain of an electrified vehicle according to one embodiment of the present invention.

FIG. 1 shows a hybrid electric vehicle 10 as one type of vehicle for implementing a PWM variation of the present invention. Vehicle wheels 11 may be driven by an internal combustion engine 12 and/or by a traction motor 13 via a transmission 14. For providing electric propulsion, motor 13 may be driven via an inverter switching bridge 15 that receives a DC link voltage at a DC link capacitor 16. The DC link voltage may result from conversion of DC power from a battery pack 17 by a converter 18 as known in the art.

Inverter 15 includes phase legs 20, 21, and 22 coupled to motor phase windings 23, 24, and 25. Phase leg 20 has an upper switching device 26 and a lower switching device 27 connected in series across DC link 16 and providing a junction 28 between devices 26 and 27 which is connected to winding 23 of motor 13. Similarly, phase leg 21 his upper switching device 30 and lower switching device 31, while phase leg 22 has upper switching device 32 and lower switching device 33. Junctions 34 and 35 are coupled to motor windings 24 and 25, respectively.

The switching devices may be comprised of IGBTs, antiparallel diodes, wide band gap FETs, or other devices. Each of the upper and lower switching devices has a respective gate terminal coupled to drivers 37 in a controller 38. Current sensors 40 coupled to each of the junctions of the phase legs measure the current flow through each phase winding. Measured current magnitudes are provided from sensors 40 to logic circuits 41 in controller 38 for use in determining PWM switching signals to be applied to the switching devices by drivers 37. As known in the art, the measured current may be compared with a desired motor current as determined according to a torque demand 42 that may be derived from operator input such as an accelerator pedal so that the operator can control the vehicle speed. Thus, current feedback determines a PWM duty cycle within logic circuits 41 that is then used to generate the timing of PWM switching signals for the phase leg switching devices.

The timing of the PWM switching signals can be represented as a square wave voltage alternating between a turn-off voltage and a turn-on voltage for each respective switching device. Logic circuits 41 and/or drivers 37 further condition the switching signals to add dead-time intervals, calibrate the signals for the devices being used, and for other reasons.

FIG. 2A shows a switching signal 45 having a transition 46 from a turn-off state to a turn-on state that defines a turn-on time. FIG. 2B shows an output voltage waveform 47 wherein output voltage waveform $V_{ce}$ across the output of the switching device starts to drop shortly after the turn-on time along a transient 48 as the device begins to conduct. FIG. 2C shows an output current waveform 50 wherein output current $I_c$ of the switching device starts to rise shortly after the turn-on time along a transient 51. Possibly after a short overshoot 52, output current $I_c$ settles down to a steady state turned-on current 53.

Similarly, FIG. 3A shows a switching signal 54 having a transition 55 from a turn-on state to a turn-off state that defines a turn-off time. FIG. 3B shows an output voltage waveform 56 wherein output voltage waveform $V_{ce}$ across the output of the switching device starts to rise shortly after the turn-off time along a transient 57 as the device prepares to cut off. Possibly after a short overshoot, output voltage $V_{ce}$ settles down to a steady state voltage 58. FIG. 3C shows an output current waveform 59 wherein output current $I_c$ of the switching device starts to drop shortly after the turn-off time along a transient 60. Output current $I_c$ settles down to a steady state turned-off current 61.

Figure 4A:
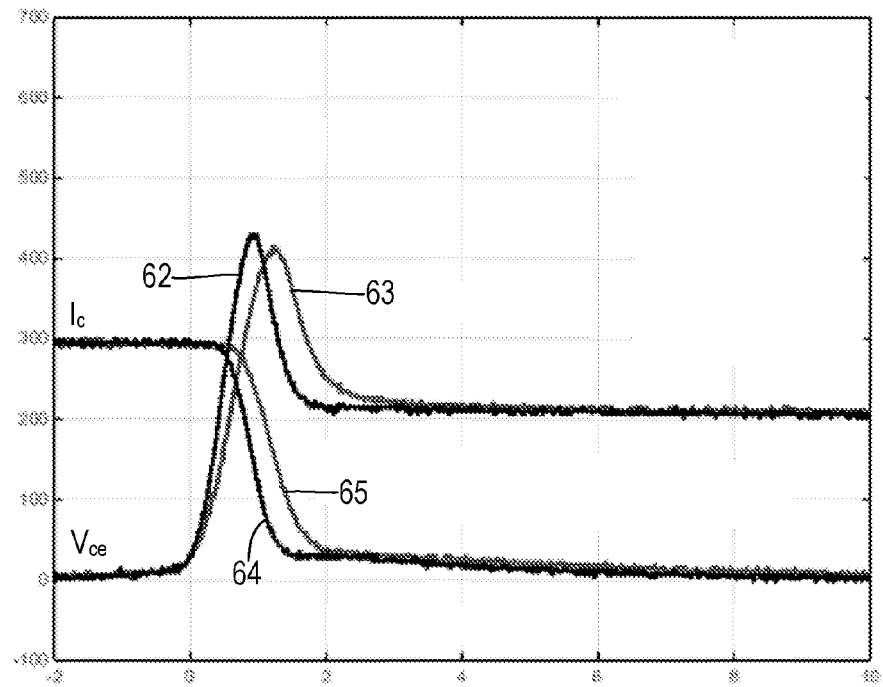
FIGS. 4A and 4B are waveform plots showing temperature variation in the turn-off and turn-on performance of a transistor device, respectively.
Figure 4B:
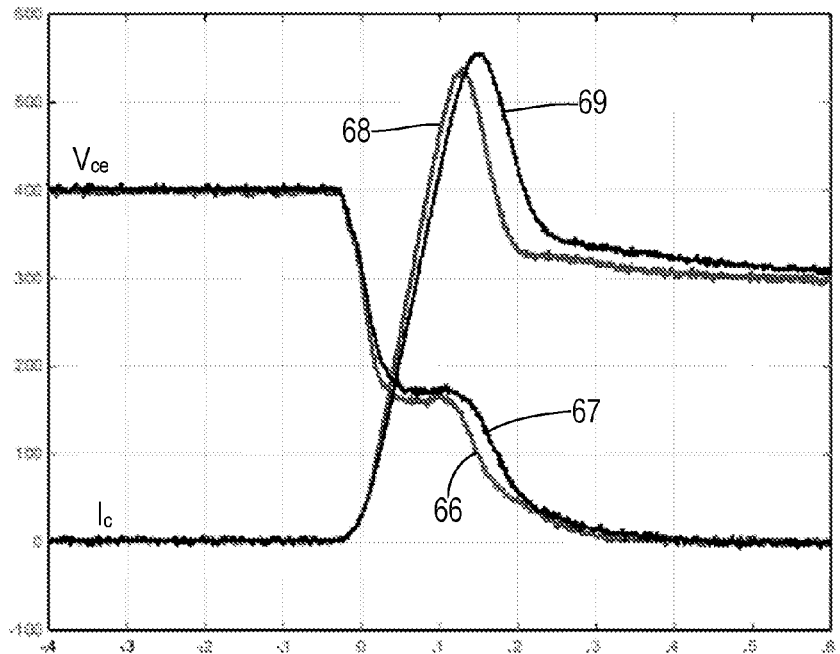

FIG. 4A shows switching transients of an output voltage $V_{ce}$ and an output current $I_c$ for an insulated gate transistor during turn-off of the device at different temperatures. A voltage trace 62 corresponds to a switching time obtained at a temperature of 25° C. A voltage trace 63 obtained at a temperature of 125° C. demonstrates a slower switching time. Regarding the device output current, a trace 64 corresponding to a temperature of 25° C. indicates a faster transient than a trace 65 which corresponds to a temperature of 125° C. FIG. 4B shows the switching transients at different temperatures for the turn-on of the device. Traces 66 and 68 show the output voltage and output current transients, respectively, at a temperature of 25° C. Traces 67 and 69 show the output voltage and output current transients, respectively, at a temperature of 125° C. with a resulting undesirable increase in the switching time.

Figure 5:
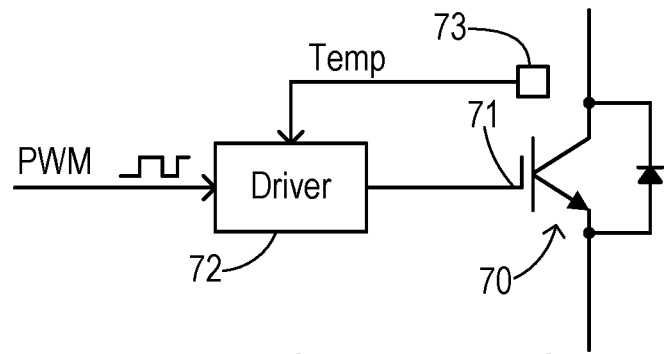
FIG. 5 is a circuit diagram showing a transistor and a driver circuit.

One conventional manner of reducing the switching time at higher temperature uses a transistor and driver as shown in FIG. 5. An insulated-gate bipolar transistor 70 with an integral reverse diode has a gate terminal 71 connected to a driver 72. A temperature sensor 73 quantifies a temperature of transistor 70 and provides a measured temperature signal to driver 72. The drive signal (e.g. drive current or drive voltage) is adjusted according to a predetermined relationship in order to retain approximately the same switching speed. The adjustment of the drive signal is comprised of a change in the drive signal amplitude which applies equally during the entire turn-on or turn-off sequence and does not treat di/dt and dv/dt separately.

Figure 6:
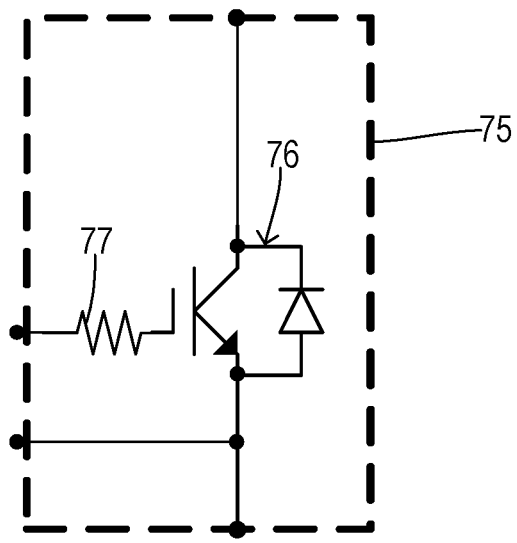
FIG. 6 is a diagram showing a prior art transistor device with a self-compensating NTC gate resistance.

Another conventional method for temperature compensation (also not taking into account the difference between that dv/dt and di/dt phases) is shown in FIG. 6 wherein a semiconductor die 75 carries an insulated-gate transistor 76 and an NTC gate thermistor 77. As the temperature of die 75 rises, the resistance of NTC thermistor decreases. The decrease of resistance increases the magnitude of the gate current so that the switching speed of transistor 76 is maintained close to the desired speed.

Figure 7:
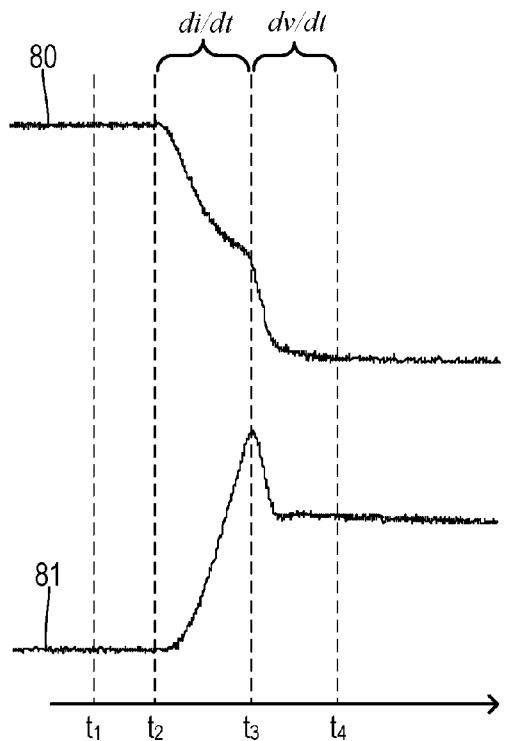
FIG. 7 is a plot showing dv/dt and di/dt phases of a switching transient during turn-on of a transistor device.

The boost in gate current of the prior art (whether modified directly or controlled indirectly by increasing the gate voltage or decreasing the gate resistance) acts continuously during the switching transient. FIG. 7 shows that the output switching transients during turn-on can be broken down into separate phases. An output voltage trace 80 and an output current trace 81 are shown on different magnitude scales but aligned in time. A PWM switch timing signal transitions to a turn-on value at a time $t_1$. The gate structure of the switching device begins to charge and after a threshold voltage is reached then an output current begins to build, starting at $t_2$. A time from $t_2$ to $t_3$ is characterized by a changing current, designated herein as a di/dt phase. The remaining portions of the switching transient are determined by the changing voltage, designated herein as a dv/dt phase.

Figure 8:
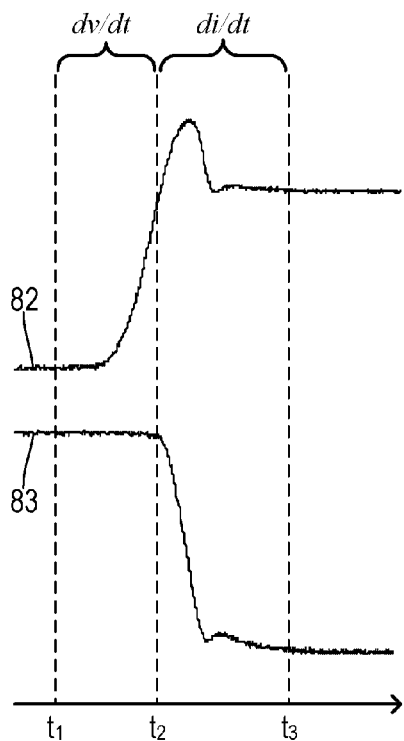
FIG. 8 is a plot showing dv/dt and di/dt phases of a switching transient during turn-off of a transistor device.

FIG. 8 shows that the output switching transients during turn-off can also be broken down into separate phases. An output voltage trace 82 and an output current trace 83 are shown on different magnitude scales but aligned in time. A PWM switch timing signal transitions to a turn-off value at a time $t_1$. The gate begins to discharge and as the device prepares to turn off, the voltage across the device begins to increase. At a time $t_2$, the device output current begins to start dropping. A time from $t_2$ to $t_3$ is characterized by a changing current, again designated as a di/dt phase. The remaining portions of the switching transient are determined by the changing voltage, again designated as a dv/dt phase.

The dv/dt portion of the junction voltage $v_{cg}$ can be determined by the below equation:

$$\frac{dv_{cg}}{dt} = \frac{i_g}{C_{cg}}$$

where as long as $i_g$ (the gate current) does not change with temperature (e.g., using a constant current source), then dv/dt does not change with temperature either (since the collector-gate junction capacitance $C_{cg}$ is not a strong function of temperature). The foregoing does not mean that $i_g$ is necessarily constant. $i_g$ can be any desired shape, but the shape keeps the same no matter what temperature it is.

The di/dt portion is determined by the below equation:

$$\frac{di_c}{dt} = 2K(V_{ge} - V_{th})\frac{dV_{ge}}{dt}$$

Threshold voltage $V_{th}$ and trans-conductance K are both changing with the temperature. Their instantaneous values can be estimated based on the measured temperature. Assume that $I_c$ (or di/dt) is selected to have an optimum shape. Then, $V_{ge}$ (and $dV_{ge}/dt$) can be calculated with the above equation at each temperature using:

$$V_{ge} = V_{th} + \sqrt{\frac{I_c}{K}}$$

where $V_{ge}$ is the gate voltage across the gate capacitance. Furthermore, gate supply voltage ($V_g$) or gate current ($i_g$) can be obtained as follows:

$$i_g = C_{ge}\frac{dV_{ge}}{dt} \text{ and}$$

$$V_g = V_{ge} + R_g i_g.$$

As mentioned above, the transient waveforms are significantly impacted by temperature changes only during the di/dt phase. By modifying the gate drive profiles according to temperature only during the di/dt phase, a more accurate compensation is obtained which results in better optimization of switching speed with reduced device stress and increase efficiency.

Figure 9:
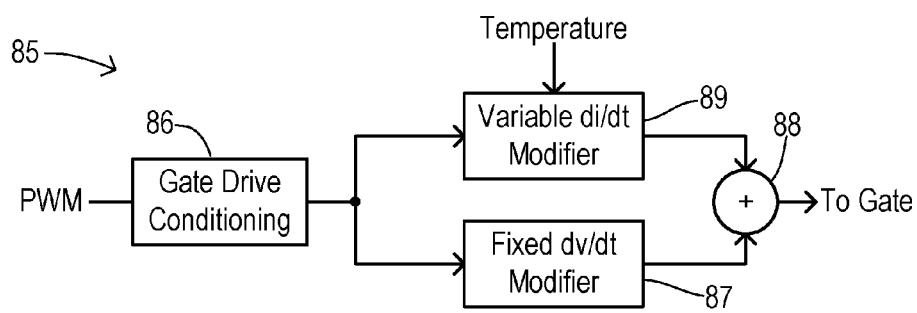
FIG. 9 is a block diagram showing one embodiment of a gate driver of the invention.

FIG. 9 shows a gate drive profile generator 85 according to one preferred embodiment wherein a PWM switch timing signal is converted to a switching device drive signal in a manner that optimizes temperature compensation according to the respective phases discussed above. Thus, the PWM timing signal is provided to a gate drive conditioning block 86 for handling conventional functions such as dead-time insertion. A conditioned gate drive signal from block 86 is provided to a fixed modifier 87 which provides a constant compensation profile regardless of temperature in order to obtain an optimized transient during the dv/dt phase. A gate drive signal with the fixed modification is provided to one input of an adder 88.

Figure 10:
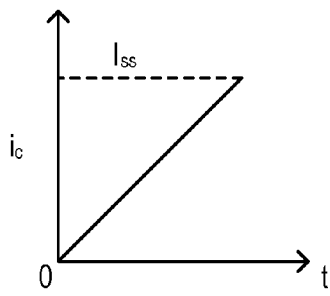
FIG. 10 is a plot showing one preferred example for a transient output current of a turning-on transistor during the di/dt phase.
Figure 11:
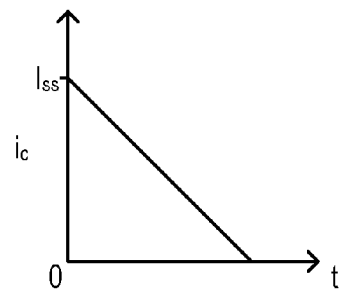
FIG. 11 is a plot showing one preferred example for a transient output current of a turning-off transistor during the di/dt phase.

The conditioned gate drive signal from block 86 is further provided to a variable modifier 89 which also receives a device temperature signal. Based on the quantified temperature, variable modifier 89 determines an appropriate adjustment to the profile for the drive signal during the di/dt phase in order to obtain a consistent output current transient regardless of device temperature. Variable modifier 89 may, for example, be comprised of a lookup table and a digital-to-analog converter in order to introduce the appropriate modifications to a respective input of adder 88 at the appropriate time during the di/dt phase. Preferably, fixed modifier 87 modifies the original square wave signal during the dv/dt phase and variable modifier 89 modifies the original square wave signal during the di/dt phase. An output of adder 88 is coupled to a gate terminal of the corresponding transistor for indirectly controlling the gate current, for example. In a preferred embodiment, the transient current during the di/dt phase may preferably have a constant slope for a constant time period during each of the turn-on and turn-off transients as shown in FIGS. 10 and 11, respectively. Trajectories other than a straight line can also be employed. In any case, each current trajectory has a minimum value of zero and a maximum value of $I_{ss}$ (corresponding to the steady state current for the device).

Figure 12:
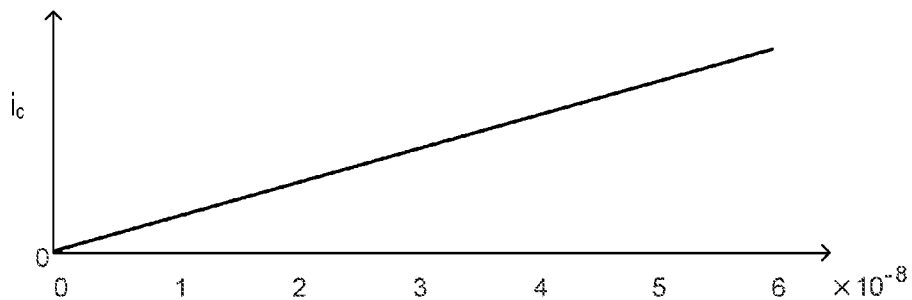

A first example during device turn-on is shown in FIGS. 12-15. The constant slope during the di/dt phase is shown in FIG. 12 as a slope magnitude a. The current through the switching device is determined according to a formula:

$$I_c = K(V_{ge} - V_{th})^2$$

Figure 13:
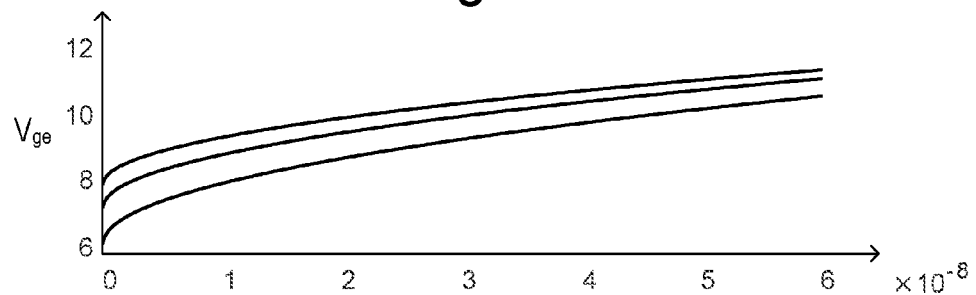
FIG. 13 is a plot showing a calculated variation in a voltage $V_{ge}$ to obtain the desired current transient of FIG. 12.
Figure 14:
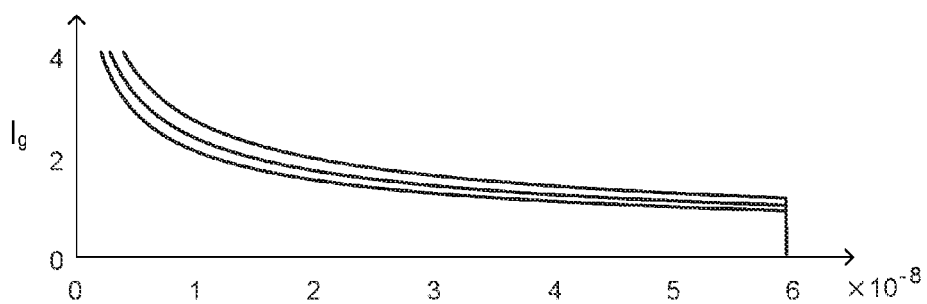
FIG. 14 is a plot showing a calculated variation in a gate current $I_g$ to obtain the desired current transient of FIG. 12.
Figure 15:
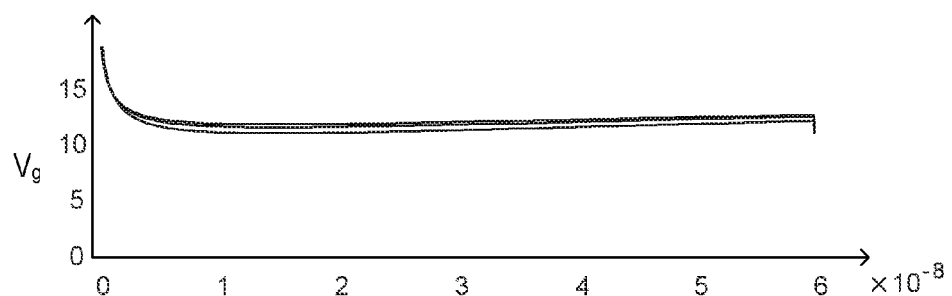
FIG. 15 is a plot showing a calculated variation in a gate supply voltage $V_g$ to obtain the desired current transient of FIG. 12.
Figure 16:
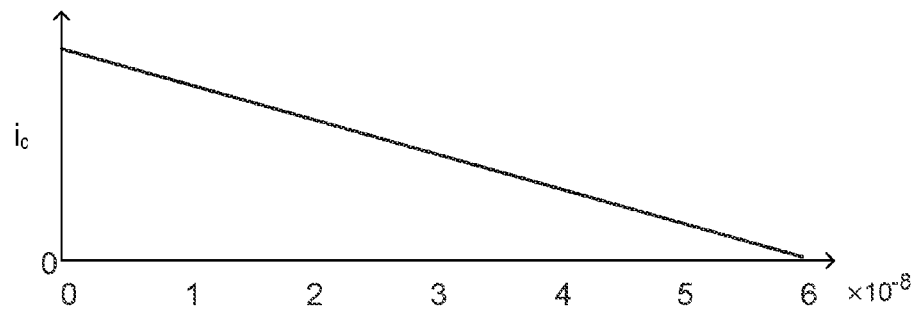
FIG. 16 is a plot showing a representative example with a constant slope for a desired collector current transient during a di/dt phase with the device turning off.
Figure 17:
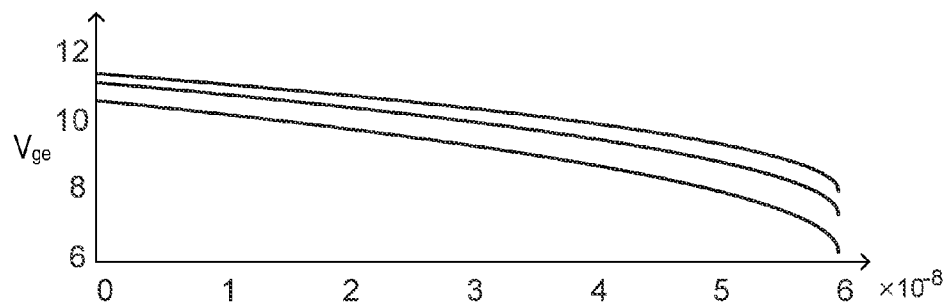
FIG. 17 is a plot showing a calculated variation in a voltage $V_{ge}$ to obtain the desired current transient of FIG. 16.
Figure 18:
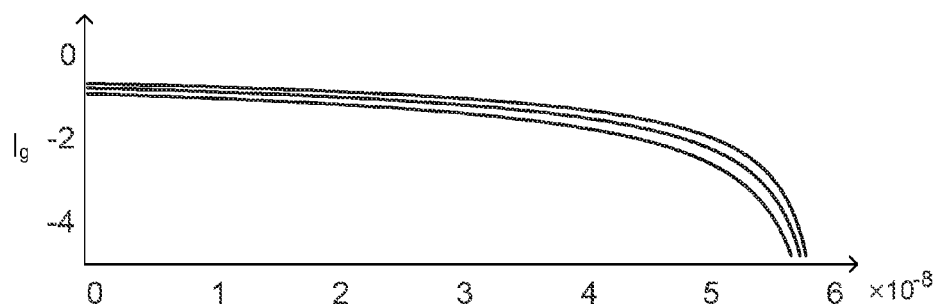
FIG. 18 is a plot showing a calculated variation in a gate current $I_g$ to obtain the desired current transient of FIG. 16.
Figure 19:
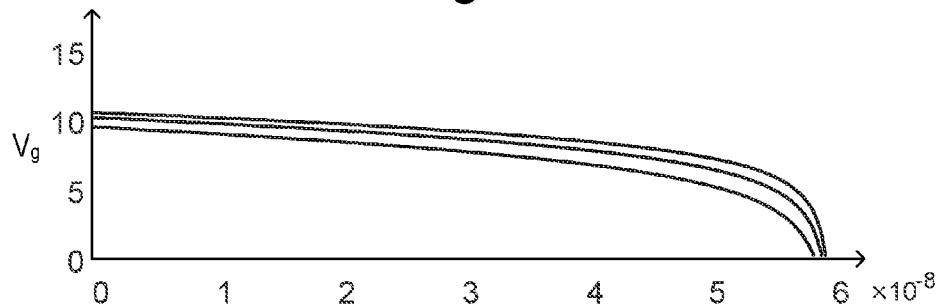
FIG. 19 is a plot showing a calculated variation in a gate supply voltage $V_g$ to obtain the desired current transient of FIG. 16.

During turn on, $V_{ge}$ can be determined using:

$$V_{ge} = V_{th} + \sqrt{\frac{a*t}{K}}$$

and during turn off using:

$$V_{ge} = V_{th} + \sqrt{\frac{I_{ss} - a*t}{K}}$$

where $I_{ss}$ is the steady state current, a is the slope of the linear current, t is the time, K is the trans-conductance, and $V_{th}$ is the threshold voltage. The calculated values for $V_{ge}$, $i_g$, and $V_g$ using values for K and $V_{th}$ at various temperatures are shown in FIGS. 13-15, respectively. The desired slope –a is shown in FIG. 16 for turn-off, and the calculated values for $V_{ge}$, $i_g$, and $V_g$ using values for K and $V_{th}$ at various temperatures are shown in FIGS. 17-19, respectively.

Figure 20:
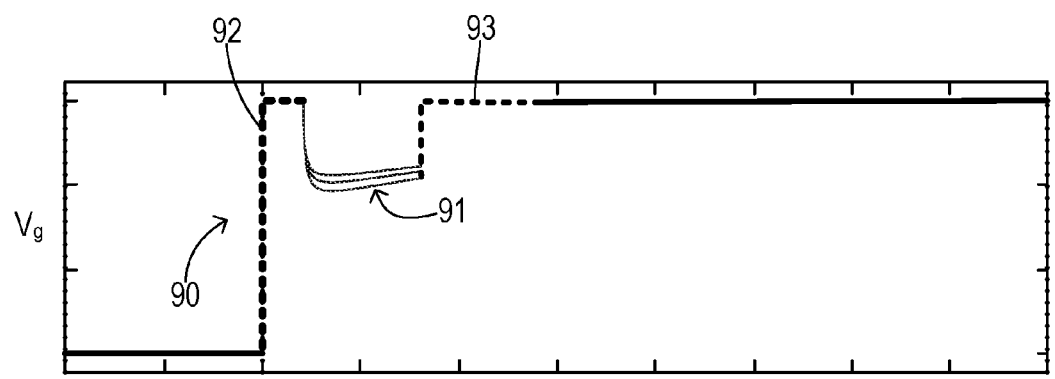

A full profile 90 for a gate voltage $V_g$ during device turn on is shown in FIG. 20 wherein the drive signal is adjusted in response to temperature during a di/dt phase 91. In other words, the square wave signal based on the PWM timing signal is adjusted during di/dt phase 91 using one of the illustrated profile adjustments that matches the measured temperature. During dv/dt phase 93, the square wave signal based on the PWM timing signal is not adjusted according to temperature, although certain other adjustments may be used in order to obtain a desired switching speed (any such adjustments would thus apply regardless of temperature). The dashed line during phases 92 and 93 indicate that any other fixed modification can be made.

Figure 21:
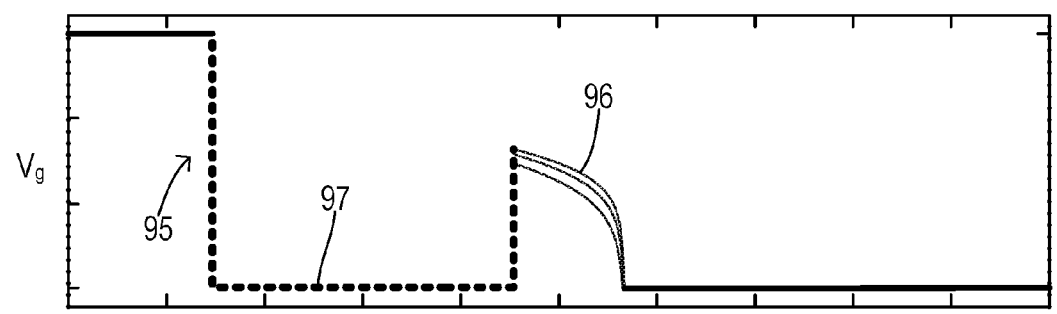
FIG. 21 is a waveform diagram showing a modified gate drive profile during dv/dt and di/dt phases with the device turning off.

A full profile 95 for a gate voltage $V_g$ during device turn off is shown in FIG. 21 wherein the drive signal is adjusted in response to temperature during a di/dt phase 96. In other words, the square wave signal based on the PWM timing signal is adjusted during di/dt phase 96 using one of the illustrated profile adjustments that matches the measured temperature. During dv/dt phase 97, the square wave signal based on the PWM timing signal is not adjusted according to temperature, although certain other adjustments may be used in order to obtain a desired switching speed (any such adjustments would thus apply regardless of temperature). The dashed line during phase 97 indicates that any other fixed modification can be made.

In a method of the invention, transient switching current in a power transistor can be controlled by establishing square wave gate drive signal. A temperature of the transistor is measured. A profile of the drive signal is adjusted to provide a desired transient switching current, wherein the profile during a di/dt phase of the switching current is adjusted in response to the device temperature and during the dv/dt phase is not adjusted in response to the device temperature.

What is claimed is:

1. A power switching circuit, comprising:
   an insulated gate power switching device;
   a timing circuit determining a switch timing signal comprising desired on and off switching times of the switching device;
   a temperature monitor quantifying a device temperature; and
   a gate drive profile generator generating a switching device drive signal according to the switch timing signal and having a dv/dt phase and a di/dt phase during a switching transient of the switching device, wherein the drive signal has a profile during the di/dt phase that is adjusted in response to the device temperature, and wherein the drive signal has a profile during the dv/dt phase that is not adjusted in response to the device temperature.

2. The circuit of claim 1 wherein the gate drive profile generator is a controlled current source.

3. The circuit of claim 1 wherein the drive signal is a modified square wave wherein the profile during the di/dt phase is configured to maintain a predetermined transient current through the switching device.

4. The circuit of claim 3 wherein the predetermined transient current has a constant slope.

5. The circuit of claim 1 wherein the profile during the di/dt phase is comprised of a varying current supplied to a gate of the switching device.

6. The circuit of claim 5 wherein the varying current is controlled by adjusting a voltage of the drive signal.

7. The circuit of claim 6 wherein the voltage $V_{ge}$ of the gate drive signal during the di/dt phase while turning on the switching device conforms to the formula:

$$V_{ge} = V_{th} + \sqrt{\frac{a*t}{K}}$$

where $V_{th}$ is a threshold voltage of the switching device at the device temperature, a is a constant number defining the time function of the predetermined transient current, and K is the trans-conductance of the switching device at the device temperature.

8. The circuit of claim 6 wherein the voltage $V_{ge}$ of the gate drive signal during the di/dt phase while turning off the switching device conforms to the formula:

$$V_{ge} = V_{th} + \sqrt{\frac{I_{ss} - a*t}{K}}$$

where $V_{th}$ is a threshold voltage of the switching device at the device temperature, $I_{ss}$ is a nominal turn-on current, a is a constant number defining the time function of the predetermined transient current, and K is the trans-conductance of the switching device at the device temperature.

9. The circuit of claim 1 wherein the switching device is connected in an inverter bridge, and wherein the switch timing signal is comprised of a pulse-width modulation (PWM) control signal.

10. The circuit of claim 1 wherein the drive signal is a modified square wave wherein the profile during the dv/dt phase is configured to maintain a predetermined transient voltage across the switching device.

11. The circuit of claim 10 wherein the predetermined transient voltage conforms to the formula:

$$\frac{dv_{cg}}{dt} = \frac{i_g}{C_{cg}}$$

where $v_{cg}$ is the junction voltage, $i_g$ is the gate current, and $C_{cg}$ is the collector-gate junction capacitance.

12. A power converter comprising:
a DC link configured to receive a DC supply voltage;
a phase leg comprising a pair of switching devices coupled across the DC link, wherein a junction between the switching devices is configured to be coupled to a load;
temperature sensors measuring temperatures of the switching devices; and
a PWM timing circuit determining switch timing signals comprising desired on and off switching times of the switching devices;
a gate drive profile generator generating switching device drive signals according to the switch timing signals, wherein transitions in the drive signals have a dv/dt phase and a di/dt phase, wherein the di/dt phase of the drive signal has a profile that is adjusted in response to the device temperature, and wherein the dv/dt phase of the drive signal has a profile that is not adjusted in response to the device temperature.

13. The power converter of claim 12 wherein the gate drive profile generator is a controlled current source.

14. The power converter of claim 12 wherein the drive signals are modified square waves wherein the profile during the di/dt phase is configured to maintain a predetermined transient current through the switching device.

15. The power converter of claim 12 wherein the profiles during the di/dt phase are comprised of a varying current supplied to a gate of the switching device.

16. The power converter of claim 12 wherein the varying current is controlled by adjusting a voltage of the drive signals, and wherein a voltage $V_{ge}$ of the gate drive signals during the di/dt phase while turning on one of the switching devices conforms to the formula:

$$V_{ge} = V_{th} + \sqrt{\frac{a*t}{K}}$$

where $V_{th}$ is a threshold voltage of the switching device at the device temperature, a is a time function defining the predetermined transient current, and K is the trans-conductance of the switching device at the device temperature.

17. The power converter of claim 12 wherein the varying current is controlled by adjusting a voltage of the drive signals, and wherein a voltage $V_{ge}$ of the gate drive signals during the di/dt phase while turning off one of the switching devices conforms to the formula:

$$V_{ge} = V_{th} + \sqrt{\frac{I_{ss} - a*t}{K}}$$

where $V_{th}$ is a threshold voltage of the switching device at the device temperature, $I_{ss}$ is a nominal turn-on current, a is a time function defining the predetermined transient current, and K is the trans-conductance of the switching device at the device temperature.

18. The power converter of claim 12 wherein the drive signals are modified square waves wherein the profile during the dv/dt phase is configured to maintain a predetermined transient voltage across the switching device, and wherein the predetermined transient voltage conforms to the formula:

$$\frac{dv_{cg}}{dt} = \frac{i_g}{C_{cg}}$$

where $v_{cg}$ is the junction voltage, $i_g$ is the gate current, and $C_{cg}$ is the collector-gate junction capacitance.

19. A method of controlling a transient switching current in a power transistor comprising:
establishing square wave gate drive signal;
measuring a temperature of the transistor;
adjusting a profile of the drive signal to provide a desired transient switching current, wherein the profile during a di/dt phase of the switching current is adjusted in response to the device temperature and during the dv/dt phase is not adjusted in response to the device temperature.

20. The method of claim 19 wherein the desired transient current has a constant slope.

* * * * *